(12) United States Patent
Vendrow et al.

(10) Patent No.: US 10,044,597 B2
(45) Date of Patent: *Aug. 7, 2018

(54) SYSTEM AND METHOD FOR PROCESSING SERVICE REQUESTS USING LOGICAL ENVIRONMENTS

(71) Applicant: RingCentral, Inc., San Mateo, CA (US)

(72) Inventors: Vlad Vendrow, Redwood Shores, CA (US); Dmitriy Alexandrovich Solovey, San Jose, CA (US)

(73) Assignee: RingCentral, Inc., Belmont, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/679,901

(22) Filed: Apr. 6, 2015

(65) Prior Publication Data

US 2016/0036686 A1 Feb. 4, 2016

Related U.S. Application Data

(63) Continuation of application No. 14/446,690, filed on Jul. 30, 2014, now Pat. No. 9,037,747.

(51) Int. Cl.
*H04L 12/755* (2013.01)
*H04L 12/725* (2013.01)
*H04L 12/28* (2006.01)

(52) U.S. Cl.
CPC .......... *H04L 45/021* (2013.01); *H04L 45/306* (2013.01)

(58) Field of Classification Search
CPC .. H04L 45/021; H04L 45/306; H04L 12/4641
See application file for complete search history.

(56) References Cited

U.S. PATENT DOCUMENTS

| | | | |
|---|---|---|---|
| 7,668,180 B2 | 2/2010 | Ben-David | |
| 8,787,367 B2 | 7/2014 | Vendrow et al. | |
| 9,037,747 B1* | 5/2015 | Vendrow | H04L 45/306 709/238 |
| 2003/0005350 A1 | 1/2003 | Koning et al. | |
| 2004/0261121 A1 | 12/2004 | Bishop | |
| 2006/0036725 A1 | 2/2006 | Chand | |
| 2006/0064416 A1* | 3/2006 | Sim-Tang | G06F 17/3015 |
| 2008/0195755 A1 | 8/2008 | Lu et al. | |

(Continued)

*Primary Examiner* — Lonnie V Sweet
(74) *Attorney, Agent, or Firm* — Fish & Richardson P.C.

(57) ABSTRACT

Systems and methods for processing service requests using logical environments. One of the methods includes receiving, by a router in a communication service provider system, a user service request from a first communication device; determining, by the router, an identifier of a first user of the communication service provider system associated with the first incoming service request; determining, by the router, a logical environment for the first user, wherein the logical environment for the first user identifies a plurality of components of the communication service provider system used to process service requests associated with the first user; identifying, by the router, a first application cluster of a first version of an application identified in the logical environment for the first user; and routing, by the router, the first incoming service request for processing by the first application cluster of the first version of the application.

23 Claims, 7 Drawing Sheets

(56) References Cited

U.S. PATENT DOCUMENTS

| | | |
|---|---|---|
| 2009/0262726 A1 | 10/2009 | Lord |
| 2009/0265425 A1 | 10/2009 | Lipscomb et al. |
| 2011/0271278 A1 | 11/2011 | Dittrich |
| 2012/0134355 A1 | 5/2012 | Vendrow et al. |
| 2013/0232498 A1* | 9/2013 | Mangtani ............... G06F 9/5072 718/104 |
| 2013/0311583 A1* | 11/2013 | Humphreys ............ H04L 51/14 709/206 |
| 2014/0270132 A1 | 9/2014 | Vendrow et al. |

\* cited by examiner

| User | Logical Environment |
|---|---|
| 12345 | LE1 |
| 12346 | LE2 |
| 12347 | LE1 |

202

| LE ID | Components |
|---|---|
| LE1 | WEBvAc1, TASvAc2, AccA, MesA |
| LE2 | WEBvCc1, TASvAc1, AccA, CLA |

SYSTEM AND METHOD FOR PROCESSING SERVICE REQUESTS USING LOGICAL ENVIRONMENTS

CROSS-REFERENCE TO RELATED APPLICATION

This application is a continuation of U.S. application Ser. No. 14/446,690, filed Jul. 30, 2014, the disclosure of which is hereby incorporated by reference in its entirety.

BACKGROUND

This disclosure generally relates to the processing of service requests by a communication service provider system.

A communication service provider system may provide voice, facsimile, text, data, and other services to users having accounts on the hosted communication system. The communication service provider system stores data that is necessary to process user requests in one or more databases. The stored data may include user account information, contact lists for various users, e-mail or voice messages intended for users of the communication service provider, and so on.

SUMMARY

In general, one innovative aspect of the subject matter described in this disclosure can be embodied in methods that include the actions of receiving, by a router in a communication service provider system, a user service request from a first communication device; determining, by the router, an identifier of a first user of the communication service provider system associated with the first incoming service request; determining, by the router, a logical environment for the first user, wherein the logical environment for the first user identifies a plurality of components of the communication service provider system used to process service requests associated with the first user; identifying, by the router, a first application cluster of a first version of an application identified in the logical environment for the first user; and routing, by the router, the first incoming service request for processing by the first application cluster of the first version of the application. Other embodiments of this aspect include corresponding systems, apparatus, and computer programs, configured to perform the actions of the methods, encoded on computer storage devices.

These and other embodiments can each optionally include one or more of the following features. The actions can further include: maintaining, by a global universal directory (GUD), data associating each of a plurality of logical environments with components of the communication service provider system that are included in the logical environment; maintaining, by the GUD, data associating each of a plurality of users of the communication service provider system with a respective logical environment; receiving, by the GUD, a registration request from the router; determining, by the GUD, a plurality of logical environments that include the router; and providing, by the GUD, data identifying relevant components of the plurality of logical environments that include the router to the router, wherein the relevant components are a subset of the components in the logical environments that include the router.

Determining the logical environment for the first user can include: providing, by the router, the identifier of the first user to the GUD; and receiving, from the GUD, data identifying the logical environment for the first user from the GUD. Identifying the first application cluster of a first version of an application identified in the logical environment for the first user can include: determining, from the user service request, an appropriate application type for processing the service request; and identifying, from the data identifying relevant components of the logical environment for the first user, an application cluster of an application of the appropriate application type.

The actions can further include: processing, by the first application cluster, the user service request. The actions can further include: obtaining, by the first application cluster and from the GUD, data identifying relevant components of each of a plurality of logical environments that include the first application cluster. Processing the user service request can include: determining that user data of a particular type is necessary to process the user service request; identifying, from the data identifying the relevant components of the logical environment for the first user, a cluster of data services, wherein the cluster of data services manage access to one or more databases that store user data of the particular type for the first user; and requesting the user data of the particular type necessary to process the user service request from the cluster of data services.

The communication service provider system can include a plurality of data service partitions for the user data of a particular type, wherein each data service partition corresponds to a disjoint subset of users of the communication service provider system, and wherein each data service partition comprises one or more databases that store user data of the particular type for the corresponding disjoint subset of users and one or more clusters of data services that manage access to the one or more databases.

Processing the user service request can include: determining that communicating with an application of a different application type is necessary to process the user service request; identifying, from the data identifying the relevant components of the logical environment for the first user, a second application cluster of a second version of an application of the different application type; and initiating communication with the second application cluster.

Processing the user service request can include: determining that communicating with a particular non-data storage service is necessary to process the user service request; identifying, from the data identifying the relevant components of the logical environment for the first user, a service cluster of a first version of the non-data storage service; and transmitting a request to the particular non-data storage service.

The method can further include: receiving, by the GUD, data identifying a modification to one or more of the plurality of logical environments; and modifying, by the GUD, the one or more logical environments based on the received data. The data can replace, in a particular logical environment, a cluster of a first version of a particular application with a cluster of a second version of the particular application. The data can add, to a particular logical environment, a cluster of a first version of a new application.

The actions can further include: receiving, by the GUD, data identifying a second user to be moved from a first logical environment to a second logical environment; and modifying, by the GUD, the data associating each of a plurality of users of the communication service provider system with a respective logical environment to associate the second user with the second logical environment.

Routing the first incoming service request can include: routing the first incoming service request with an identifier of the logical environment for the user.

The actions can further include: providing a response to the user service request to the first communication device, wherein the response to the user service request includes an identifier for the logical environment for the first user; receiving a second user service request from the first communication device, wherein the second user service request includes the identifier for the logical environment for the first user; and processing the second user service request in accordance with the logical environment for the first user.

The details of one or more embodiments of the present disclosure are set forth in the accompanying drawings and the description below. Other features, aspects, and advantages of the present disclosure will become apparent from the description, the drawings, and the claims.

BRIEF DESCRIPTION OF THE DRAWINGS

FIG. 2 shows example data maintained by a GUD.

DETAILED DESCRIPTION

This disclosure describes a system that processes service requests associated with users of the system in accordance with a respective logical environment that is assigned to each user of the system. In particular, the communication provider system processes user requests using one or more applications that are each specific to a respective communication type and stores user data in partitioned databases that are each specific to a respective user data type. In particular, user data of a given type is partitioned across multiple databases that each store data of the type for a different subset of users of the communication provider system. The logical environment for a given user identifies application versions that are to be used to process requests associated with the user and database partitions where user data is stored.

Particular embodiments of the subject matter described in this disclosure can be implemented to realize one or more of the following advantages. By defining a logical environment for each user of a communication provider system, service requests can easily be correctly routed to the appropriate application, which can easily identify the database partition that stores user data for processing the request. The application version that is to be used to process requests associated with a particular user can be easily modified. Upon the user data of a particular type being associated with a different database partition, applications needing to access user data can easily determine which database partition now stores the data for a given user.

Figure 1A:
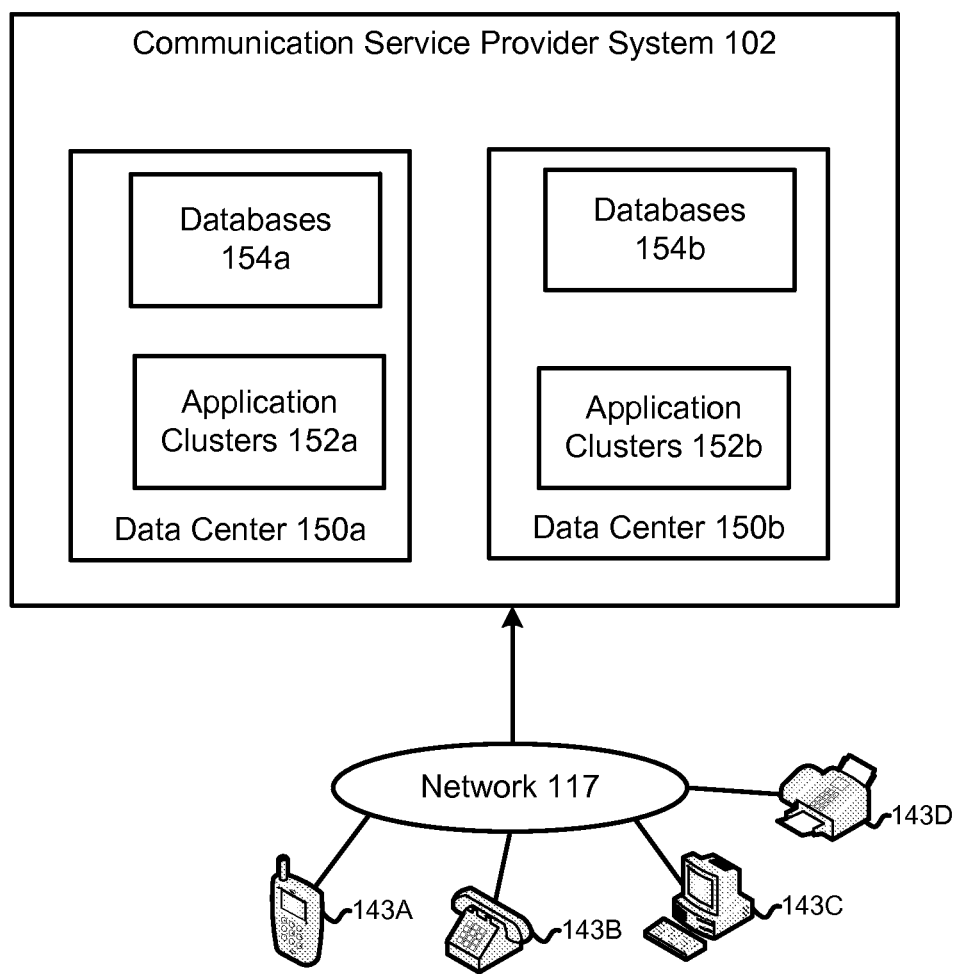
FIG. 1A shows an example of a communication service provider system.

FIG. 1A shows an example of a communication service provider system 102. The communication service provider system 102 can be, for example, a hosted private branch exchange (PBX) system, which can also be referred to as a virtual PBX, a cloud-based PBX, an internet telephony system, or an Internet Protocol (IP) PBX. Unlike a premise-based PBX, which requires PBX equipment to be physically located on or near the user premises where the PBX services are to be provided, a hosted PBX can provide PBX communication services over the Internet, including services such as, without limitation, voice over IP (VOIP), facsimile over IP (FOIP), call forwarding, voicemail, web-based online account management, and other similar PBX functions.

The communication service provider system 102 can receive service requests, i.e., requests for communication services, from various communication devices 143A-143D. The communication devices can include a cellular phone 143A, a landline phone 143B, a computer 143C, and a facsimile (fax) machine 143D. The landline phone 143B can include plain old telephone service (POTS) phones and voice-over-Internet Protocol (VOIP) phones. The computer 143C can be installed with telephony software to perform functions of a phone. The computer 143C can also be installed with other software (e.g. a web browser) which allows it to communicate with the communication service provider system 102 over a network, e.g., a local area network (LAN), a wide area network (WAN), or a combination of the two. Other communication devices that are not shown can also be used as the communication devices 143A-143D, such as computer tablets and other personal digital devices. Though not illustrated, service requests can be routed through other provider networks (e.g. cellular networks, PSTN, wireless networks, etc.) and gateways before reaching the network 117. The network 117 can be a packet-based network, such as the Internet or other Internet Protocol (IP) based networks.

Depending on the communication capabilities of the communication device 143A-D and the communication services offered by the communication service provider system 102, service requests received from the communication device 143A-D can include requests of various types, e.g., requests for voice, facsimile (fax), video, text, email, web browsing, or data services. In some embodiments, incoming service requests are formatted according to a packet-based protocol. In some embodiments, some incoming service requests are formatted as a request according to the Session Initiation Protocol (SIP), the Hypertext Transfer Protocol (HTTP), an email protocol (e.g. Simple Mail Transfer Protocol (SMTP), Post Office Protocol 3 (POP3), or SOAP (which previously stood for Simple Object Access Protocol). Other protocols are possible.

The communication service provider system 102 includes multiple data centers 150a and 150b, with each of the data centers executing multiple application clusters and maintaining user data in multiple databases, e.g., the data center 150a executes application clusters 152a and maintains multiple databases 154a for storing user data while the data center 150b executes application clusters 152b and maintains multiple databases 154b for storing user data. An application cluster is a group of one or more instances of a particular version of an application. As will be described in more detail below with reference to FIG. 1B, when a service request is received at one of the data centers 152a or 152b, the communication service provider system 102 selects which application from the application clusters executing on the data center to use to process the request and which database to access to obtain user data necessary to process the request based on a logical environment for a user associated with the service request. Depending on the type of service request, in order to process the request, the system can fulfill the request by transmitting data, e.g., call data, to the communications device from which the request was received, to another communications device, or both.

Figure 1B:
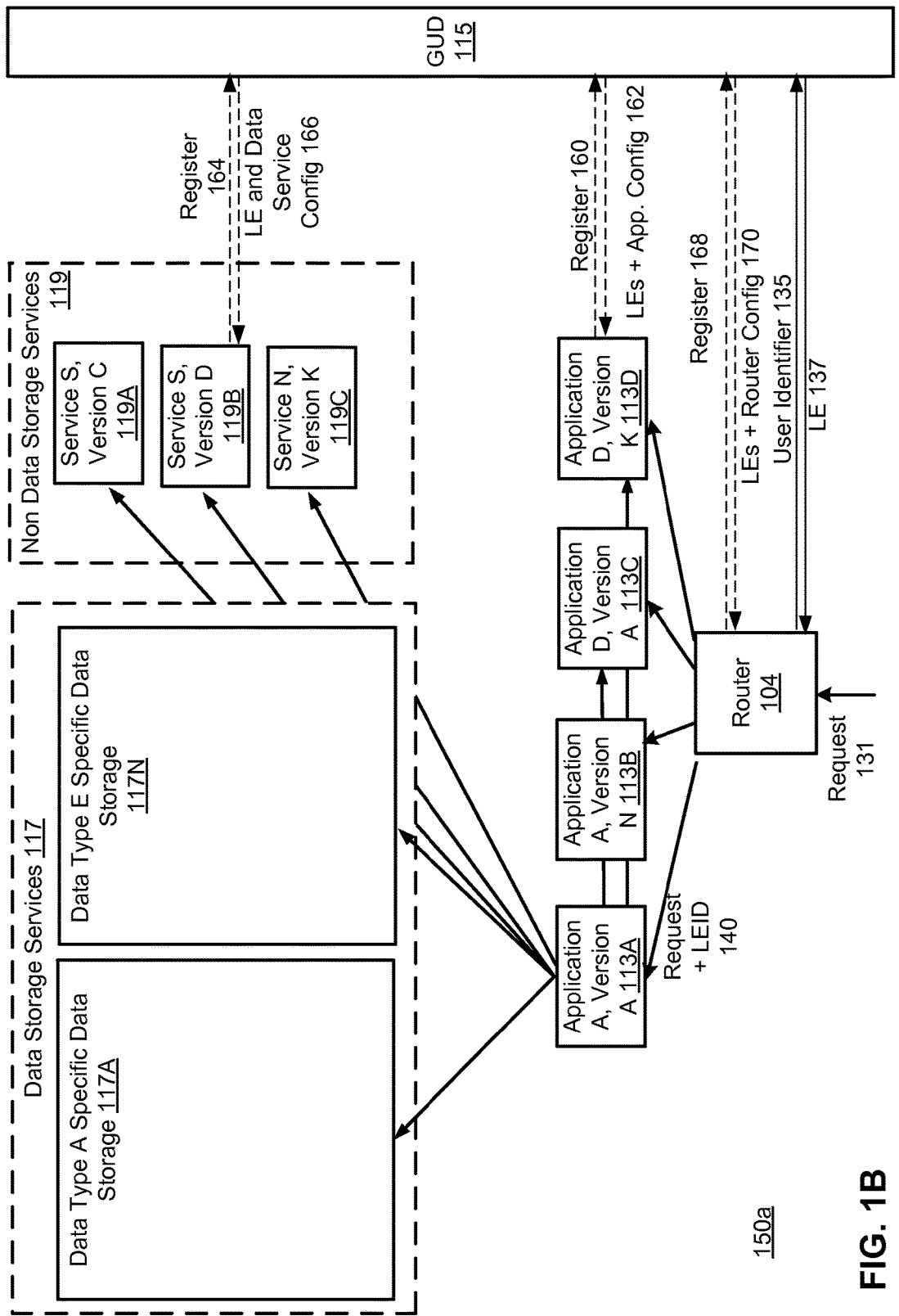
FIG. 1B shows a detailed view of a data center of an example communications service provider system.

FIG. 1B shows a detailed view of a data center of an example communication service provider system, e.g., the data center 150a of the communication service provider system 102 of FIG. 1A.

As shown in FIG. 1B, the data center 150a includes clusters of multiple applications 113A-113D that are used to process service requests. Each of the applications is specific to a respective type of service request. That is, each of the applications is used to process a particular type of service request. For example, one of the applications 113A-D may be used to process telephone calls, i.e., to connect and provide call data to communications devices in response to received call requests, and another may be used to process web service requests, e.g., to provide a user interface for presentation on a communications device that shows various account information in response to a user request to access their account online. The communications service provider system 102 may maintain clusters of multiple versions of some or all of the applications 113, e.g., versions A-N of Application A and versions A-K of Application D. Generally, each version of a given application executes independently of each other version of the given application. For a given application 113 for which multiple versions are maintained, each of the versions is used to process service requests for a different subset of users of the communications service provider system 102. While not illustrated in FIG. 1B, in some embodiments, the system maintains multiple clusters of the same application version in the same data center.

For example, the communication service provider system 102 may maintain one version of an application that is designated as stable and another version of the application that is designated as testing. One subset of users may have their associated service requests processed by the stable version while another subset of users may have their associated requests processed by a testing version. As another example, certain users of the communication service provider system 102 may be employees of one corporate entity that uses one version of an application and other users may be employees of another corporate entity that uses a different version of the application.

In some embodiments, each application instance in a given cluster executes on a different server within the data center 150a, i.e., each application instance executes on a different physical computing system. In some other embodiments, however, multiple instances of an application, instances from multiple different clusters, or both, execute on the same physical computing system, i.e., on the same server in the data center 150a. For example, multiple application instances from one or more clusters can execute in different virtual machines or in the same virtual machine on the same physical computing system.

In order to process user requests, the data center 150a stores data that is necessary to process the user requests using data storage services 117. The stored data for a given user may include user account information, data identifying contacts associated with the user account, e-mail or voice messages intended for users of the communication service provider, and so on. In particular, the data center 150a stores the user data using type-specific data storage 117A-N. Each type-specific data storage 117A-N is specific to a respective data type, i.e., is used to store user data of a respective data type. For example, one of the data storages may be used to store user contact lists while another of the data storages may be used to store voicemail messages intended for users of the telecommunication service provider system 102. Within a given type-specific data storage, the stored user data is partitioned across multiple databases. That is, each of the databases in a given type-specific data storage stores user data of the corresponding type for a particular disjoint subset of the users of the communication service provider system 102. Additionally, each of the multiple databases can be associated with one or more clusters of data services that receive requests from applications or other components of the communication service provider system 102 that need to access data of the corresponding type, access the appropriate database to obtain the requested data, and provide the requested data to the requesting components. Type-specific data storages are described in more detail below with reference to FIG. 1C.

In some embodiments, the data center 150a can also include one or more non-data storage services 119. In the example embodiment illustrated in FIG. 1B, the data center 150a includes clusters of two different versions of one service 119A and 119B and one version of a different service 119C. However, in other embodiments, the data center 150a can include multiple versions of multiple non-data storage services, multiple clusters of the same version of a non-data storage service, and so on. The non-data storage services can include various non-data storage services necessary for the communication service provider system 102 to process user requests. For example, the non-data storage services may include a file conversion service that converts received files from one file format to another. As another example, the non-data storage services may include a text-to-speech service that receives text and generates an audio file of an audio representation of the text. As another example, the non-data storage services may include a speech recognition service that receives an audio file of a spoken utterance and generates a text representation of the utterance. As another example, the non-data storage services may include a machine translation service that translates text in one language to text in another language. Other kinds of non-data storage services are possible.

Generally, a given non-data storage service cluster receives a request from one of the application clusters 113A-113D to perform a particular service, performs the requested service, and then provides the result of the service to the requesting application or, if specified in the request, to a different component. As part of performing the requested service, the non-data storage service may need to access data stored in one of the data storage services 117, e.g., to access a file that is to be converted to a different format or to access a stored text message that is to be converted to an audio message.

For a given user of the communication service provider system 102, requests associated with the user are processed using a particular combination of application clusters, data storage service components, non-data storage service clusters, and so on, executing in the data center 150a. The particular combination of components used to process requests for the user is referred to herein as the logical environment for the user. Data defining the logical environment, i.e., data identifying the application clusters, the non-data storage service clusters, and the data storage service components that are used to process requests for the user, is stored by the data center 150a in a global universal directory (GUD) 115. That is, the GUD stores data associating each of a set of users of the communication service provider system with a logical environment for the user, e.g., as described below with reference to FIG. 2.

The GUD 115 stores configuration information for the data center 150a. The configuration information includes data identifying each instance of an application or a service executing in the data center 150a and, for each instance, data identifying the cluster that the instance belongs to. For each service and each application cluster, the configuration information also includes data identifying other components of the communication service provider system 102, i.e., service clusters, application clusters, and databases, that the instances in the cluster may need to communicate with in order to process user requests. In some embodiments, some of the components may be located in one or more other data centers of the communication service provider system 102. The configuration information data identifying each database in the data center 150a and the subset of users that the database stores data for.

Additionally, when a new component, for example, a new database or a new instance of a service or application, is launched in the data center 150a, the new component registers identifying information for itself in the GUD 115. For example, when an application instance is launched as part of a cluster 113D, the application instance sends a registration request 160 to the GUD 115. The registration request 160 includes data identifying the application instance, e.g., a unique identifier for the application instance, a network address of the application instance, or both, data identifying the application type of the instance, and data identifying the application version of the instance. The unique identifier for the application instance can be, for example, a unique application registration identifier that is generated by the application instance when the instance is first launched. In response, the GUD 115 provides logical environment and application configuration data 162 to the application instance. In particular, the GUD 115 assigns the application instance to the cluster 113D and generates the logical environment and application configuration data 162 based on the assigned cluster. In some embodiments, the GUD 115 assigns the instance to a cluster based on input received from a user, e.g., a system administrator or other operator of the system. In some other embodiments, the GUD 115 assigns the instance to a cluster based on the application version and application type data received from the instance in accordance with one or more pre-defined rules.

The application configuration data identifies the other components that the applications in the cluster 113D may communicate with in order to process user requests. For example, the other components can include data storage service components, clusters of non-data storage services, and other clusters of applications. The logical environment data includes data identifying each logical environment that the cluster 113D belongs to, and, for each identified logical environment, the other relevant components of the logical environment. Determining the relevant components of a logical environment is described below with reference to FIG. 3.

As another example, when a non-data storage service instance in the non-data storage service cluster 119B is launched, the service instance sends a registration request 164 to the GUD 115. The registration request 164 includes data identifying the service instance, e.g., a unique identifier for the service instance, a network address of the service instance, or both, data identifying the non-data storage service type of the instance, and data identifying a version of the service instance. In response, the GUD 115 assigns the instance to the cluster 119B and provides logical environment and data service configuration data 162 to the service instance. The data service configuration data identifies the other components that the services in the cluster 119B may communicate with in order to process user requests. For example, the other components can include application clusters that can send requests to the service cluster and components of data storage services that the service cluster may need to obtain user data from. The logical environment data includes data identifying each logical environment that the cluster 119B belongs to, and, for each identified logical environment, the other relevant components of the logical environment. As will be described in more detail below with reference to FIG. 3, components of the data storage services 117 can also register themselves with the GUD 115 when they are launched.

Thus, as will be described in more detail below with reference to FIG. 3, the GUD 115 maintains data identifying logical environments, data associating each user of the communication service provider system 102 with one of the logical environments, and identifying information for each component currently deployed in the data center 150a.

When a service request, e.g., the service request 131, is received, the request is routed in accordance with the data stored in the GUD 115, e.g., data identifying the logical environment for the user associated with the request and the data identifying the components currently deployed in the data center 150a.

The service request 131 can originate from a source device (e.g., one of the communication devices 143A-143D or other similar electronic devices), and can be routed through the network 117 to the data center 150a, where it is received by a router 104. While only one router 104 is shown in FIG. 1B, the data center 150a can include multiple routers to assist in processing large numbers of incoming service requests.

When the router 104 is launched, the router registers itself with the GUD 115 by sending a registration request 168 to the GUD 115. In response, the GUD 115 provides logical environment and router configuration data 162 to the router 104. The router configuration data identifies the other components that the router may route user requests to for processing. The other components include application clusters executing in the data center 150a and, optionally, application clusters or routers executing in another data center of the communication service provider system 102. The logical environment data includes data identifying each logical environment that the router belongs to, and, for each identified logical environment, the other relevant components of the logical environment.

The service request 131 can be, for example, a phone call or a fax from a source device to a user of the communication service provider system 102. The service request 131 can include, for example, a phone or a fax number associated for the user account that the phone call or fax is directed to. As another example, the service request 131 can also be a request for online worldwide web services from a user. For example, a user can log in to an online account which can show billing information, am activity log, any messages sent and received, and other account information on a webpage provided to the user by an application from the applications 113A-D that processes web service requests. As another example, the service request 131 can include, for example, an account login name for the user account that the user is trying to access. As another example, the service request 131 can be an email from a source device to a user of the communication service provider system 102. The service request 131 can include, for example, an email address for the user account that the email is directed to.

The router 104 can identify a user identifier 135 from the service request 131. The identifier 135 uniquely identifies a user account associated with service request 131. For example, the user identifier may be a phone number assigned to the account, a username associated with the account, or another system-generated identifier for the account. For some incoming user requests, e.g., for a request to initiate a new user session with the system, the router 104 cannot identify an identifier for the user request. In these cases, the router 104 can route the request to an application that can prompt the user to enter log-in credentials or other identifying information that can be used to determine the identifier that should be associated with subsequent requests submitted by the user.

In response to receiving a service request that is associated with a user identifier, the router 104 can query the GUD 115 to determine the logical environment for the user. That is, the router 113 queries the GUD 115 by providing the identifier 135 to the GUD 115 and obtaining in return logical environment data 137 from the GUD 115. The logical environment data 137 includes data identifying the logical environment for the user associated with the request, e.g., a system-generated identifier for the logical environment. When the logical environment data 137 is received, the router 104 can determine whether the router stores data identifying the relevant components of the identified logical environment, i.e., the components to which the router 104 can potentially route the request. If the router 104 does not store data identifying the relevant components, the router 104 can query the GUD 115 to obtain the components, e.g., as described below with reference to FIG. 3.

Once the router 104 determines that it has access to data identifying the relevant components, the router 104 determines which of the application clusters 113A-D should be used to process the service request 131 and routes the service request 131 to the cluster that is included in the logical environment for the user. The router 113 determines the appropriate application for the service request based on the request type. That is, the router 113 selects the application that is specific to the request type as the application to be used to process the service request and then routes the request to the cluster of that application that is in the logical environment for the user. For example, the router 104 transmits a routed request and a logical environment identifier 140 for the user to an application instance in application cluster 113A.

Once the service request 131 is routed to the appropriate cluster of applications, in order to fulfill the request, the application may need to access user data stored in one of the components of data storage services 117, route the service request to a different application cluster for further processing, or interact with a non-data storage service 119 in order to fulfill the request. In order for the application to identify the appropriate component, the application determines the component of the appropriate type that is included in the logical environment identified by the logical environment identifier attached to the routed request. Thus, the application can determine the component necessary to fulfill the request from data associated with the routed request and forward the request or obtain the needed data from the necessary component.

Figure 1C:
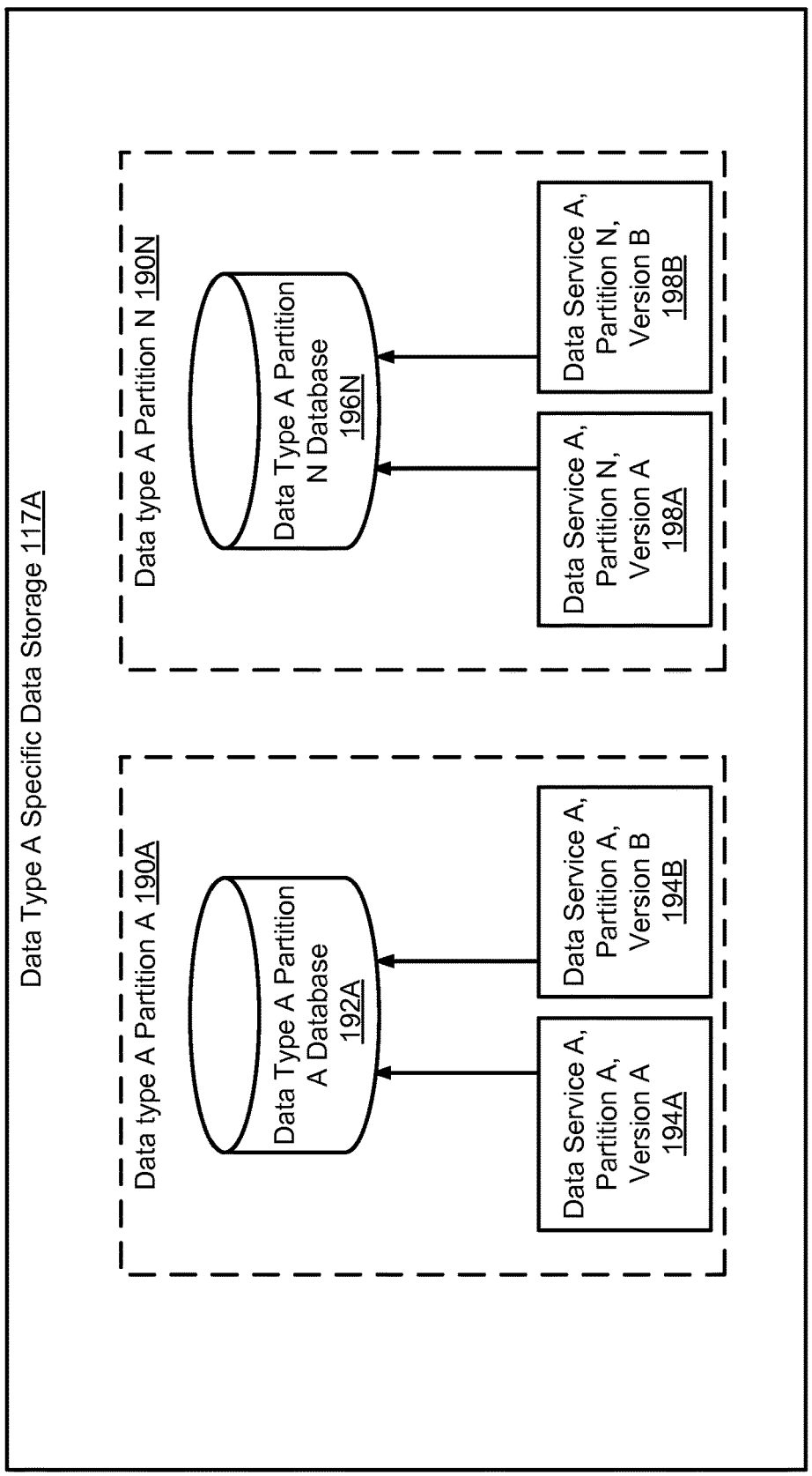
FIG. 1C shows a detailed view of an example type-specific data storage.

FIG. 1C shows a detailed view of an example type-specific data storage, e.g., the type-specific data storage 117A of the data center 150A of FIG. 1B. The type-specific data storage 117A is used by the communication service provider system 102 to store data of a particular type A for users of the communication service provider system 102.

The type-specific data storage 117A includes multiple partitions 190A-190N. Each partition stores data of the type A for a disjoint subset of the users of the communication service provider system 102. In particular, each partition 190A-190N includes a database, e.g., databases 192A or database 196N, that stores the data for the users in that partition's subset. The databases in different partitions may be of various database types and may be provided by various different database vendors. That is, the database 192A may be a database of a first type that is provided by a first vendor while the database 196N may be a database of a second type that is provided by a second vendor. Depending on the types of databases, some or all of the databases in the partitions of the data storage 117A may be sharded databases. Additionally, in some embodiments, each partition includes multiple databases to allow for redundant storage of the user data.

Each partition 190A-190N also includes one or more clusters of data services, e.g., data services 194A-B and data services 198A-198B. The clusters of data services in a given partition can include multiple clusters of the same version of a data service, clusters of different versions of a data service, or both. Each data service cluster in the partition for the data type A 190A manages access to the databases in the partition. That is, each data service cluster receives requests from applications or other components of the communication service provider system 102 that need to access data of the type A for a user in the partition's subset, accesses the database to obtain the requested data for the user, and provides the requested data to the requesting components. As with other components of the communication service provider system 102, when a data service instance is launched, the data service instance registers itself with the GUD and provides the GUD with data identifying the service type and service version of the data instance. In response, the GUD assigns the instance to a cluster of data services and provides the instance with logical environment and data service configuration data.

FIG. 2 shows example data maintained by a GUD, e.g., the GUD 115 of FIG. 1B. In particular, FIG. 2 shows a data structure 202 associating users with logical environment identifiers and a data structure 204 associating logical environment identifiers with components of the corresponding logical environment. The data structure 202 includes data associating a user "12345" with a logical environment identified by the identifier "LE1," a user "12346" with a logical environment identified by the identifier "LE2" and a user "12347" with the logical environment identified by the identifier "LE1."

The data structure 204 identifies that the logical environment "LE1" includes identifiers for two application clusters, i.e., "WEBvAc1" and "TASvAc2," and two type-specific database partitions, i.e., "AccA" and "MesA" that are to be used to process requests associated with users associated with the logical environment. In particular, the identifier "WEBvAc1" indicates that cluster 1 of version A of an application for handling requests for online worldwide web services should be used to process requests from the users and the identifier "TASvAc2" indicates that cluster 2 of version A of an application for handling telephone calls should be used to process requests associated with the users. Similarly, the identifier "AccA" indicates that user account data is stored in partition A of the type-specific data storage that stores user account data for users of the communication service provider system 102, and the identifier "MesA" indicates that messages, e.g., voice messages, text messages, or both, associated with the user are stored in partition A of the type-specific data storage that stores messages associated with users of the communication service provider system 102.

Similarly, the data structure 204 identifies that the logical environment "LE2" includes identifiers corresponding to the same applications as the logical environment "LE1." However, the logical environment "LE2" may identify one or more of: different versions of one or more of the applications than the logical environment "LE1," different clusters of the same application version, or different partitions of the type-specific data storage than the logical environment "LE1" In the example of FIG. 2, the logical environment "LE2" includes an identifier "WEBvC" that indicates that cluster 1 of version C of the application for handling requests for online worldwide web services should be used to process requests from users. The logical environment "LE2" also includes an identifier "TASvAc1" that cluster 1 of version A of an application for handling telephone calls should be used to process requests associated with the users. Like the logical environment "LE1," the logical environment "LE2" includes the identifier "AccA." However, the environment "LE 1" includes an identifier "CLA" that indicates that indicates that contact list data associated with the user is stored in partition A of the type-specific data storage that stores contact list information for users of the communication service provider system 102. The logical environment "LE2" does not include an identifier for a message type-specific data storage, e.g., because the telecommunication service provider system 102 does not offer that service to users that are associated with the "LE2" logical environment.

While the data structure 204 identifies only one cluster of each application version that should be used to process requests for users associated with each logical environment, in some cases the data structure 204 may identify multiple clusters of the same application version, one or more in one data center, one or more in a different data center, or both. Additionally, the data structures 202 and 204 may also identify clusters of data storage services and non-data storage services that are included in the logical environments.

Figure 3:
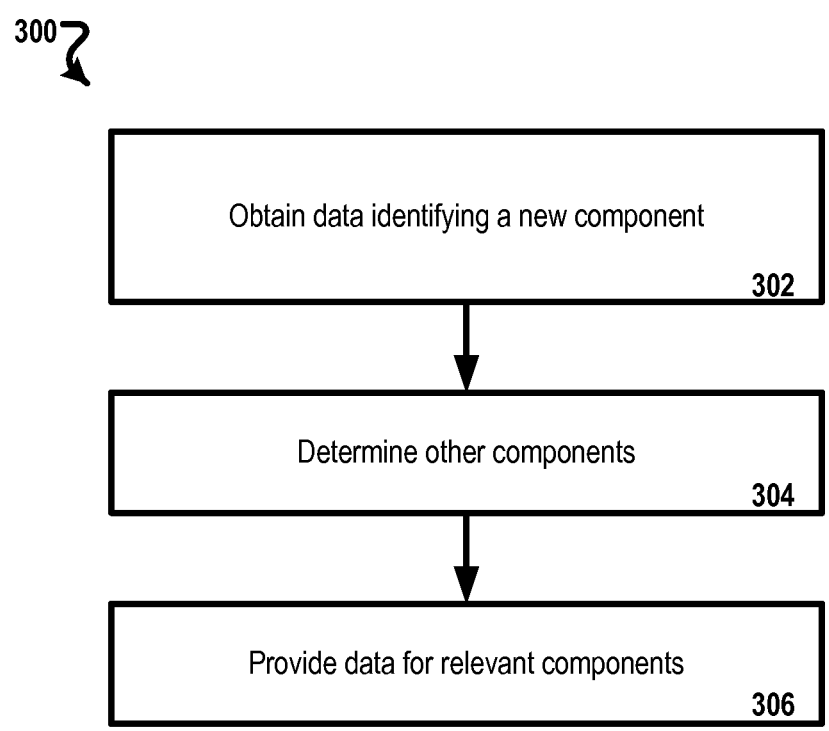
FIG. 3 is a flow diagram of an example process for registering a new component with a GUD.

FIG. 3 is an example process 300 for registering a new component with a GUD. For convenience, the technique 300 will be described with respect to a system including one or more computers in one or more geographic locations, that performs the technique 300. For example, the technique 300 can be performed by a communication provider system, e.g., the communication provider system 102 of FIG. 1.

At step 302, data is received identifying a new component. For example, a GUD can receive registration data from a new component that has been launched within a communication provider system. The new component can be any of a variety of processes that execute within the communication provider system. For example, the new component can be a new routing process, a new application, a new version of an existing application, a new database, a new data service process, a new non-data storage service process, and so on. The new component may be configured to provide registration data to the GUD immediately after the new process is launched. The registration data includes an identifier of the new component, data identifying the type of the new process, data identifying the version of the new process, and, optionally, the other types of components that the new component sends data to as part of processing user requests.

At step 304, the new process is assigned to a cluster and other components to which the new process sends data as part of processing user requests are identified. For example, if the new component is a router, it can be determined that the router sends data to applications of particular types and does not interact with database partitions, but if the new process is a new application instance in a particular application cluster, it can be determined that the applications in the cluster sends data to and retrieves data from one or more databases of particular types, sends requests to particular other application clusters, and but does not send data to any routing processes. The types of applications, databases, or both that the new component interacts with can be determined from the registration data. That is, if the registration data identifies types of components that the new component interacts with, the active components of that type can be identified from data maintained in the GUD. If the registration data does not identify the types of other components, the types can be by assigning the new process to a cluster and determining the components that the new process interacts with from the cluster that the new process is included in. That is, the GUD may maintain data identifying which other active components each active cluster sends and receives data from as part of processing user requests.

Thus, because each new component registers itself with the GUD, the GUD maintains data identifying each currently active component, the cluster that the component is included in, and the other components that it is necessary for the component to interact with. Optionally, each component is configured to provide updates to the GUD at pre-determined intervals. If the GUD does not receive an update from a component for more than a threshold time window, the GUD determines that the component is no longer active and marks the data associated with the component to indicate that the component is no longer active. Optionally, the GUD can also transmit data to other components that indicates that the component has become inactive.

At step 306, data is provided to the requesting component that identifies relevant components of a first logical environment. In some embodiments, the data is provided in response to a request that is received from the new component for logical environment data for a first logical environment. The request is a request to determine the components of the first logical environment. For example, the new process may provide an identifier of the first logical environment that was received with a service request to the GUD to determine which components belong to the logical environment. Thus, the new component only obtains data about logical environments when necessary, i.e., when processing a request associated with the logical environment. In some other embodiments, the data is provided to the component automatically after the registration data is received, i.e., in response to the registration request. For example, the GUD may provide data identifying all of or a subset of the logical environments that are currently associated with at least one user in the data maintained by the GUD to the new component after the registration information is received from the component. In these embodiments, when an update to the logical environment data maintained by the GUD is received, the GUD sends the updated logical environment data to the other components of the communication service provider system 102 to ensure that no components route requests in accordance with outdated logical environment data.

Rather than providing to the requesting process data identifying each component of the logical environment, only those components that are relevant, i.e., to which the new component sends data as part of processing service requests, are provided to the new component as part of the data identifying components of the first logical environment.

That is, the GUD can receive the request for logical environment data, identify the components of the logical environment, and provide data for those components that match the types of components that the new component interacts with to the component. Thus, the amount of data needing to be maintained for each logical environment by each component of the system is reduced.

Figure 4:
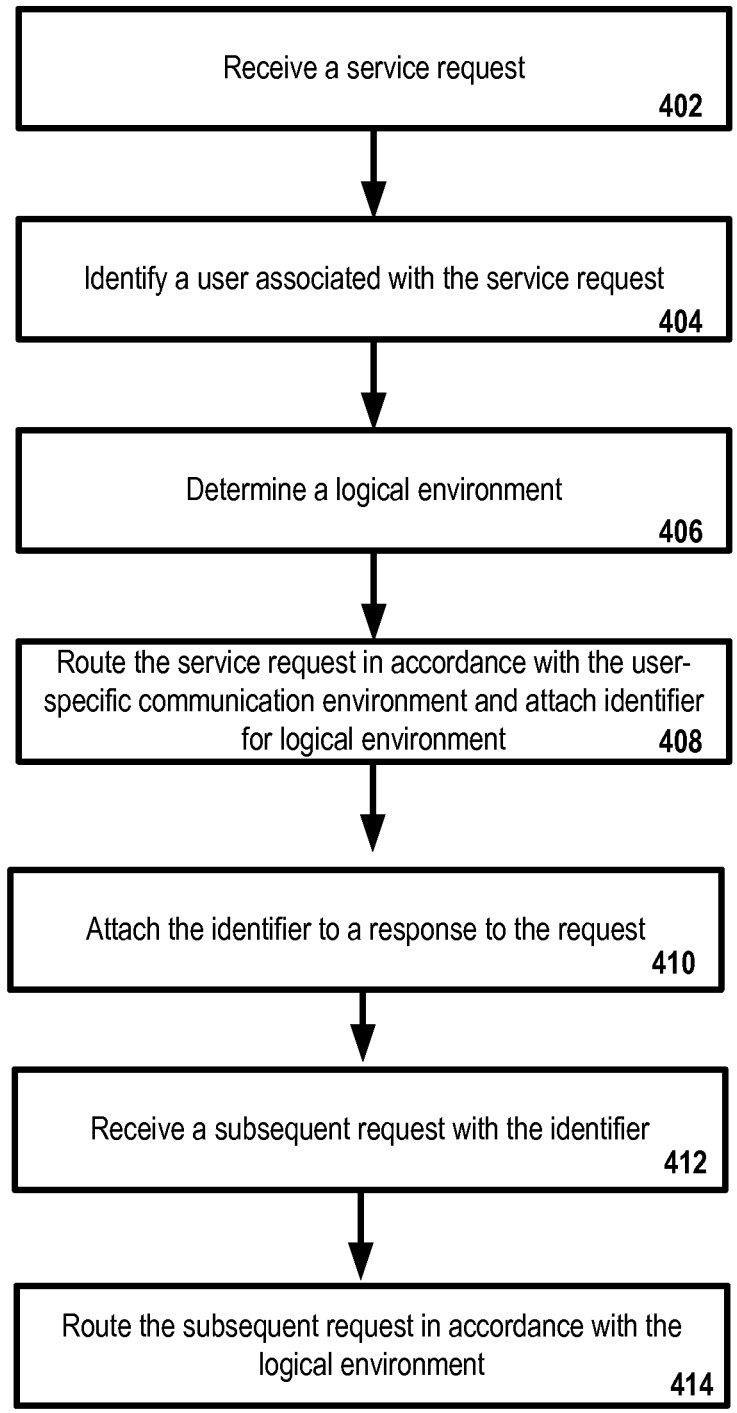
FIG. 4 is a flow diagram of an example process for routing a service request using a logical environment.

FIG. 4 is a flow diagram of an example process 400 for processing a service request using a logical environment. For convenience, the technique 400 will be described with respect to a system including one or more computers in one or more geographic locations, that performs the technique 400. For example, the technique 400 can be performed by a communication provider system, e.g., the communication provider system 102 of FIG. 1.

At step 402, a service request is received. For example, the service request may be an incoming call, a web request to access a user account, and so on.

At step 404, an identifier of a user account associated with the service request is identified. For example, the identifier may be a phone number associated with the user account, a username associated with the account, or another identifier that uniquely identifies the account. The manner in which the identifier is extracted from the service request may depend on the type of the service request. In some cases, the request may not include identifying information. In these cases, the user submitting the request can be prompted to log-in or otherwise supply an identifier, e.g., by routing the user request to an application of a type that is specific to authentication requests.

At step 406, the logical environment for the user account is determined and relevant components of the logical environment are identified. In particular, in order to determine the logical environment for the user account, data identifying the user account, e.g., the identifier extracted from the service request, is provided to a GUD. In response to receiving a user identifier, the GUD provides data that defines the logical environment. For example, the data may include an identifier for the logical environment. In some cases, a router that processes the request can determine whether the router has access to data identifying the relevant components of the logical environment identified in the data. If the router does not have access to the relevant component data, the router can query the GUD to obtain data identifying the relevant components.

At step 408, an identifier for the logical environment is attached to the request and the request is routed for processing in accordance with the logical environment for the user account, i.e., is routed to the cluster of the version of the application that is appropriate for the type of the service request and that is a component of the logical environment. In some cases, the relevant component to which the request is to be routed may execute in a different data center from the data center where the request was received. For example, the relevant components included in the logical environment may, for a particular application type, only identify a cluster of applications that executes in the different data center. As another example, the relevant components may, for a particular application type, identify one application cluster in the same data center and one application cluster in a different data center. In these cases, it may be determined that the application cluster in the same datacenter is not active, e.g., by querying the GUD or from data previously received from the GUD, and the application cluster executing in the different data center can be selected.

At step 410, the identifier for the logical environment for the user is attached to a response to the request that is transmitted to the user. For example, if the request is an Internet request the logical environment identifier can be attached to the response as a routing cookie.

At step 412, a subsequent request is received that includes the identifier for the logical environment.

At step 414, the request is processed by routing the request in accordance with the logical environment for the user, i.e., without needing to submit an additional request to the GUD.

Figure 5:
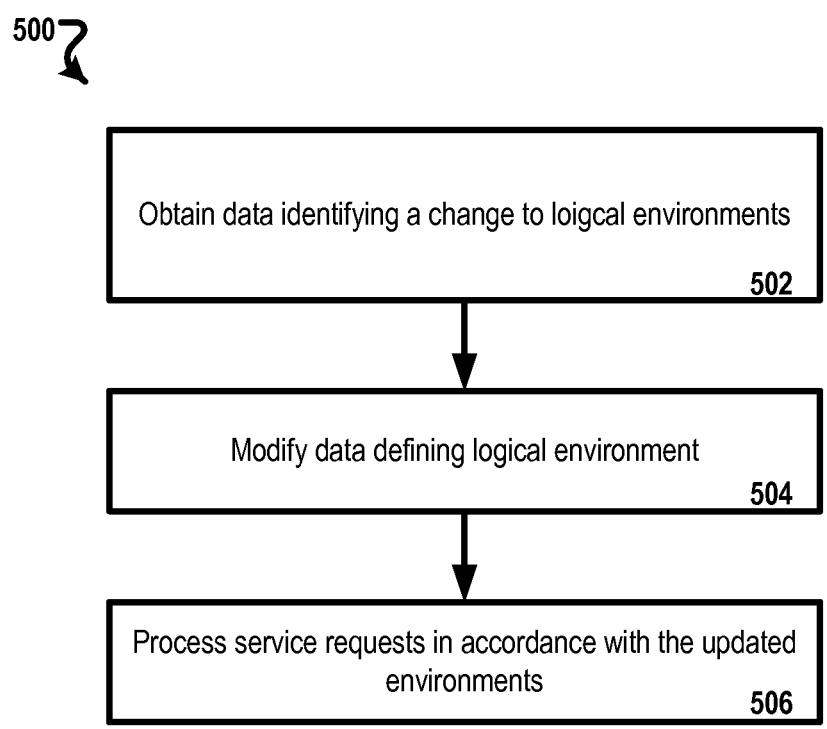
FIG. 5 is a flow diagram of an example process for updating a logical environment.

FIG. 5 is a flow diagram of an example process 500 for updating a logical environment. For convenience, the process 500 will be described with respect to a system including one or more computers in one or more geographic locations, that performs the technique 500. For example, the technique 500 can be performed by a communication provider system, e.g., the communication provider system 102 of FIG. 1.

At step 502, data identifying a change to logical environments for one or more users is received. For example, the data may indicate that one or more users should be moved from a first logical environment that uses a cluster of a "stable" version of an application to a second logical environment that uses a version that was formerly identified as the "testing" version of the application, i.e., because the version has been determined to be stable. As another example, the data may indicate that a new logical environment has been created that includes a newly-launched "testing" version of an application and identify one or more users that should be associated with the new logical environment. As another example, the data may indicate that a new application cluster of a new application or of a new version of an application has been added to an existing logical environment.

At step 504, data maintained by the GUD associating logical environments with users is modified. If the data identifying the change indicates that users should be moved from one logical environment to another, data associating logical environments with those users is modified to associate the users with the other logical environment. If the data indicates that a new logical environment has been created, data associating the components of the new logical environment with an identifier for the new logical environment is added to the data maintained by the GUD. If the data also identifies users that should be associated with the new logical environment, the data maintained by the GUD is modified to associate the users with the identifier for the new logical environment.

At step 506, service requests are processed in accordance with the updated logical environments. Thus, a logical environment can be easily modified and requests can continue to be accurately routed after a modification is made. In some cases, a user may be moved from one logical environment to another during a user session with the communication provider system. In these cases, service requests associated with the user are routed according to the old logical environment for the user until the user session is terminated. Service requests during subsequent user sessions can then be processed in accordance with the new logical environment for the user.

Optionally, once the data maintained by the GUD is modified, active components that are affected by the change in logical environments that have been modified can be sent an update message that identifies the change in the logical environments. For example, if data identifying the relevant components in a given logical environment that has previously been sent to a component has become stale due to the change in logical environments, updated relevant component data can be sent to the component.

In some embodiments, certain components in the communication service provider system 102 communicate with components that are external to the communication service provider system 102, i.e., that execute outside of and independently from the communication service provider system 102, in order to process service requests. For example, an application that determines availability statuses for users of the communication service provider system 102 may need to obtain availability data from sources that are external to the communication service provider system 102, e.g., from an external calendaring service or from an external instant messaging service. In these embodiments, because the components are external, the components do not register themselves in the GUD when they are launched. Instead, the communication service provider system 102 registers identifying information for the external components in the GUD, and the GUD adds the external components to the appropriate logical environments.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
maintaining environment-component data associating each logical environment of a plurality of logical environments with components of a communication service provider system that are included in the logical environment, wherein components of the communication service provider system comprise application clusters and clusters of data services, and each logical environment includes application clusters and clusters of data services that are used to process requests for users associated with the logical environment;
maintaining environment-user data associating each of a plurality of users of the communication service provider system with a respective logical environment of the plurality of logical environments;
receiving a registration request from a router in the communication service provider system;
determining a first subset of the plurality of logical environments that include the router;
providing relevant component data to the router that identifies, for each logical environment in the first subset, relevant components of the communication service provider system that are included in the logical environment;
receiving, by the router, a first incoming service request to the communication service provider system; and
using, by the router, the relevant component data and the environment-user data to route the incoming first service request, including determining a first logical environment in the first subset that corresponds to the first incoming service request and a relevant component of the first logical environment that corresponds to the first incoming service request.

2. The method of claim 1, wherein using, by the router, the relevant component data and the environment-user data to route the first incoming service request comprises:
receiving, by the router, the first incoming service request from a first communication device;
determining, by the router, an identifier of a first user of the communication service provider system associated with a first incoming service request;
determining, by the router and based on the environment-user data, that the first logical environment is a logical environment for the first user, wherein the logical environment for the first user identifies a plurality of the components of the communication service provider system used to process service requests associated with the first user;
identifying, by the router and based on the environment-component data, a first application cluster of a first version of an application identified in the first logical environment; and
routing, by the router, the first incoming service request for processing by the first application cluster of the first version of the application.

3. The method of claim 2, wherein determining that the first logical environment is the logical environment for the first user comprises:
providing, by the router, the identifier of the first user to a directory; and
receiving, from the directory, data identifying the first logical environment.

4. The method of claim 2, wherein identifying the first application cluster of a first version of an application identified in the first logical environment comprises:
determining, from the user service request, an appropriate application type for processing the service request; and
identifying, from the data identifying relevant components of the first logical environment, an application cluster of an application of the appropriate application type.

5. The method of claim 2, further comprising:
processing, by the first application cluster, the user service request.

6. The method of claim 5, further comprising:
obtaining, by the first application cluster, data identifying relevant components of each of a plurality of logical environments that include the first application cluster.

7. The method of claim 6, wherein processing the user service request comprises:
determining that user data of a particular type is necessary to process the user service request;
identifying, from the data identifying the relevant components of the first logical environment, a cluster of data services, wherein the cluster of data services manage access to one or more databases that store user data of the particular type for the first user; and
requesting the user data of the particular type necessary to process the user service request from the cluster of data services.

8. The method of claim 7, wherein the communication service provider system comprises a plurality of data service partitions for the user data of a particular type, wherein each data service partition corresponds to a disjoint subset of users of the communication service provider system, and wherein each data service partition comprises one or more databases that store user data of the particular type for the corresponding disjoint subset of users and one or more clusters of data services that manage access to the one or more databases.

9. The method of claim 6, wherein processing the user service request comprises:
determining that communicating with an application of a different application type is necessary to process the user service request;
identifying, from the data identifying the relevant components of the first logical environment, a second application cluster of a second version of an application of the different application type; and initiating communication with the second application cluster.

10. The method of claim 6, wherein processing the user service request comprises:

determining that communicating with a particular non-data storage service is necessary to process the user service request;

identifying, from the data identifying the relevant components of the first logical environment, a service cluster of a first version of the non-data storage service; and transmitting a request to the particular non-data storage service.

11. The method of claim 1, further comprising:

receiving data identifying a modification to one or more of the plurality of logical environments; and modifying the one or more logical environments based on the received data.

12. The method of claim 11, wherein the data replaces, in a particular logical environment, a cluster of a first version of a particular application with a cluster of a second version of the particular application.

13. The method of claim 11, wherein the data adds, to a particular logical environment, a cluster of a first version of a new application.

14. The method of claim 1, further comprising:

receiving data identifying a second user to be moved from a first logical environment to a second logical environment; and modifying the environment-user data to associate the second user with the second logical environment.

15. The method of claim 2, wherein routing the first incoming service request comprises:

routing the first incoming service request with an identifier of the logical environment for the user.

16. The method of claim 2, further comprising:

providing a response to the first incoming user service request to the first communication device, wherein the response to the user service request includes an identifier for the logical environment for the first user;

receiving a second user service request from the first communication device, wherein the second user service request includes the identifier for the logical environment for the first user; and processing the second user service request in accordance with the logical environment for the first user.

17. The method of claim 1, wherein a first data center in the communication services provider system comprises a plurality of application clusters of the same application and the first logical environment includes less than all of the plurality of application clusters in the first data center.

18. The method of claim 1, wherein the first logical environment includes components of the communication service provider system that reside in two or more data centers in the communication service provider system.

19. The method of claim 1, wherein each logical environment includes a particular subset of application clusters that is different from any subset of application clusters in any other logical environment.

20. A system comprising one or more computers and one or more storage devices storing instructions that when executed by the one or more computers cause the one or more computers to perform operations comprising:

maintaining environment-component data associating each logical environment of a plurality of logical environments with components of a communication service provider system that are included in the logical environment, wherein components of the communication service provider system comprise application clusters and clusters of data services, and each logical environment includes application clusters and clusters of data services that are used to process requests for users associated with the logical environment;

maintaining environment-user data associating each of a plurality of users of the communication service provider system with a respective logical environment of the plurality of logical environments;

receiving a registration request from a router in the communication service provider system;

determining a first subset of the plurality of logical environments that include the router;

providing relevant component data to the router that identifies, for each logical environment in the first subset, relevant components of the communication service provider system that are included in the logical environment;

receiving, by the router, a first incoming service request to the communication service provider system; and using, by the router, the relevant component data and the environment-user data to route the incoming first service request, including determining a first logical environment in the first subset that corresponds to the first incoming service request and a relevant component of the first logical environment that corresponds to the first incoming service request.

21. The system of claim 20, wherein using, by the router, the relevant component data and the environment-user data to route the incoming service request comprises:

receiving, by the router, a first user service request from a first communication device;

determining, by the router, an identifier of a first user of the communication service provider system associated with a first incoming service request;

determining, by the router and based on the environment-user data, that the first logical environment is a logical environment for the first user, wherein the logical environment for the first user identifies a plurality of the components of the communication service provider system used to process service requests associated with the first user;

identifying, by the router and based on the environment-component data, a first application cluster of a first version of an application identified in the first logical environment; and routing, by the router, the first incoming service request for processing by the first application cluster of the first version of the application.

22. A non-transitory computer storage medium encoded with a computer program, the computer program comprising instructions that when executed by one or more computers cause the one or more computers to perform operations comprising:

maintaining environment-component data associating each logical environment of a plurality of logical environments with components of a communication service provider system that are included in the logical environment, wherein components of the communication service provider system comprise application clusters and clusters of data services, and each logical environment includes application clusters and clusters of data services that are used to process requests for users associated with the logical environment;

maintaining environment-user data associating each of a plurality of users of the communication service provider system with a respective logical environment of the plurality of logical environments;

receiving a registration request from a router in the communication service provider system;

determining a first subset of the plurality of logical environments that include the router;

providing relevant component data to the router that identifies, for each logical environment in the first subset, relevant components of the communication service provider system that are included in the logical environment;

receiving, by the router, a first incoming service request to the communication service provider system; and using, by the router, the relevant component data and the environment-user data to route the incoming first service request, including determining a first logical environment in the first subset that corresponds to the first incoming service request and a relevant component of the first logical environment that corresponds to the first incoming service request.

23. The non-transitory computer storage medium of claim 22, wherein using, by the router, the relevant component data and the environment-user data to route the incoming service request comprises:

receiving, by the router, a first user service request from a first communication device;

determining, by the router, an identifier of a first user of the communication service provider system associated with a first incoming service request;

determining, by the router and based on the environment-user data, that the first logical environment is a logical environment for the first user, wherein the logical environment for the first user identifies a plurality of the components of the communication service provider system used to process service requests associated with the first user;

identifying, by the router and based on the environment-component data, a first application cluster of a first version of an application identified in the first logical environment; and routing, by the router, the first incoming service request for processing by the first application cluster of the first version of the application.

* * * * *